(12) United States Patent
Makabe

(10) Patent No.: US 9,269,204 B2
(45) Date of Patent: Feb. 23, 2016

(54) VEHICLE FAULT DETERMINATION DEVICE

(71) Applicant: HONDA MOTOR CO., LTD., Tokyo (JP)

(72) Inventor: Takumi Makabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 32 days.

(21) Appl. No.: 14/156,771

(22) Filed: Jan. 16, 2014

(65) Prior Publication Data

US 2014/0288772 A1 Sep. 25, 2014

(30) Foreign Application Priority Data

Mar. 21, 2013 (JP) ................. 2013-059043

(51) Int. Cl.
*G06F 7/00* (2006.01)
*G07C 5/08* (2006.01)
*B60K 17/00* (2006.01)

(52) U.S. Cl.
CPC .............. *G07C 5/0808* (2013.01); *B60K 17/00* (2013.01); *G07C 5/0825* (2013.01)

(58) Field of Classification Search
CPC .............. B60W 50/00; B60W 50/082; B60W 30/1886; B60R 16/023
USPC ......................................... 701/36
See application file for complete search history.

(56) References Cited

U.S. PATENT DOCUMENTS

| | | | |
|---|---|---|---|
| 3,899,727 A * | 8/1975 | Thayer ........................ | 318/564 |
| 4,664,870 A * | 5/1987 | Hager ......................... | 376/215 |
| 4,842,510 A * | 6/1989 | Grunden et al. .............. | 431/19 |
| 6,094,132 A * | 7/2000 | Kramer ....................... | 340/440 |
| 6,262,871 B1 * | 7/2001 | Nemir et al. ................. | 361/42 |
| 6,665,601 B1 * | 12/2003 | Nielsen ....................... | 701/50 |
| 2003/0195669 A1 * | 10/2003 | Sakurai et al. ............... | 701/1 |
| 2005/0228568 A1 * | 10/2005 | Hack et al. .................. | 701/70 |
| 2006/0072265 A1 * | 4/2006 | Bucella et al. ............... | 361/90 |
| 2006/0271336 A1 * | 11/2006 | Murphy ...................... | 702/183 |
| 2011/0063768 A1 * | 3/2011 | Sexton et al. ................ | 361/79 |
| 2011/0279082 A1 * | 11/2011 | Hagenmaier et al. ......... | 320/109 |
| 2012/0206100 A1 * | 8/2012 | Brown et al. ................ | 320/109 |

FOREIGN PATENT DOCUMENTS

JP 3097723 B2 10/2000

\* cited by examiner

*Primary Examiner* — Behrang Badii
*Assistant Examiner* — Daniel L Greene
(74) *Attorney, Agent, or Firm* — Birch, Stewart, Kolasch & Birch, LLP

(57) ABSTRACT

A vehicle fault determination device includes a relay, a vehicle configuration circuit, and a control section. The relay is connected to a power source. The vehicle configuration circuit is supplied with power from the power source via the relay. The control section determines whether the relay is faulty while controlling the relay and the vehicle configuration circuit. The control section includes first and second ports. The first port outputs a control signal to a coil portion of the relay. The second port is connected to a contact portion of the relay via the vehicle configuration circuit. The second port serves as an input port when the fault determination is made and as an operation port when the vehicle configuration circuit is controlled. Thus, the number of parts is keep to a minimum to increase the number of dedicated ports for determining whether the relay is faulty.

13 Claims, 4 Drawing Sheets

VEHICLE FAULT DETERMINATION DEVICE

CROSS-REFERENCE TO RELATED APPLICATIONS

The present application claims priority under 35 USC 119 to Japanese Patent Application No. 2013-059043 filed Mar. 21, 2013 the entire contents of which are hereby incorporated by reference.

BACKGROUND OF THE INVENTION

1. Field of the Invention

The present invention relates to a vehicle fault determination device. More particularly, to a fault determination method of a relay connected to a power source.

2. Description of Background Art

In a vehicle having an electric actuator, it has been proposed to provide a fail-safe relay between a power source and the electric actuator to positively shut off power in the event of a non-functional condition. Because of its configuration, a relay may become stuck due, for example, to welding of its contact portion. For this reason, a technique has been proposed to determine whether the contact portion is in such a non-functional condition. See, for example, Japanese Patent No. 3097723.

To provide a relay, a signal output is required to control the operation thereof. As a result, a control section needs an output port to control the relay. To determine whether the relay is faulty, an input port is required in addition to the output port. The input port is used to receive a signal that indicates the ON/OFF state of the relay during a fault determination test. The number of ports that can be accommodated in the control section is limited. Increasing the number of dedicated ports restricts the degree of freedom in designing the control section.

SUMMARY AND OBJECTS OF THE INVENTION

It is an object of an embodiment of the present invention to provide a vehicle fault determination device that keeps to a minimum the increase in number of dedicated ports for determining whether the relay is faulty.

According to an embodiment of the present invention, a vehicle fault determination device (A) includes a relay (1), a vehicle configuration circuit (2), and a control section (3). The relay (1) is connected to a power source (V). The vehicle configuration circuit (2) is supplied with power from the power source (V) via the relay (1). The control section (3) determines whether the relay (1) is faulty while controlling the relay (1) and the vehicle configuration circuit (2). The control section (3) includes first and second ports (3a) and (3b). The first port (3a) outputs a control signal to a coil portion (1b) of the relay (1). The second port (3b) is connected to a contact portion (1a) of the relay (1) via the vehicle configuration circuit (2). The second port (3b) serves as an input port when the fault determination is made and as an operation port when the vehicle configuration circuit (2) is controlled.

According to an embodiment of the present invention, the control section (3) may output a given test signal to the first port (3a) during the fault determination and determine whether the relay (1) is faulty based on the signal input to the second port (3b).

According to an embodiment of the present invention, the test signal may be a signal adapted to open the contact portion (1a) of the relay (1). The control section (3) may determine that the relay (1) is in a functional condition when the signal input to the second port (3b) indicates that the contact portion (1a) is open.

According to an embodiment of the present invention, the test signal may be a signal adapted to open the contact portion (1a) of the relay (1). The control section (3) may determine that the relay (1) is in a non-functional condition when the signal input to the second port (3b) indicates that the contact portion (1a) is closed.

According to an embodiment of the present invention, the non-functional condition may be the sticking of the contact portion (1a).

According, to an embodiment of the present invention, the control section (3) may perform the fault determination after power-on and prior to the activation of the vehicle configuration circuit (2).

According to an embodiment of the present invention, a vehicle (100) may include a differential lock (113b) adapted to lock a differential (113a) of wheels (102). The relay (1) may be the fail-safe relay (1) adapted to supply or interrupt power from the power source (V) to an electric circuit (4) of the differential lock (113b). The control section (3) may output a signal to the first port (3a) if the control section (3) determines that the fail-safe relay (1) is faulty. The signal output from the control section (3) opens the contact portion (1a).

According to an embodiment of the present invention, the vehicle fault determination device (A) may further include an indicator (36) adapted to report a fault of the fail-safe relay (1). The vehicle configuration circuit (2) may be the enable/disable relay (2) adapted to output an enable signal to the electric circuit (4) of the differential lock (113b). The enable signal enables differential locking. When the control section (3) determines that the fail-safe relay (1) is faulty, the control section (3) may activate the indicator (36) and control the enable/disable relay (2) in such a manner so as not to output the enable signal.

According to an embodiment of the present invention, the vehicle configuration circuit may be the relay (2). A coil portion (2b) of the vehicle configuration circuit (2) may be connected to the second port (3b).

According to an embodiment of the present invention, the control section (3) may include a microcomputer (31), and first and second switching elements (33) and (34a). The microcomputer (31) executes a program for the fault determination. The first switching element (33) is provided between an output port (31b) of the microcomputer (31) and the second port (3b). The second switching element (34a) is provided between an input port (31c) of the microcomputer (31) and the second port (3b). The first switching element (33) is turned ON or OFF by a signal output from the output port (31b). The second switching element (34a) is turned ON or OFF by a signal input to the second port (3b). When the first switching element (33) is turned ON, a current flows through the coil portion (2b) of the vehicle configuration circuit (2) to close a contact portion (2a) of the vehicle configuration circuit (2).

According to an embodiment of the present invention, the control section (3) may include resistors (34c and 34d) connected to the second port (3b). The resistance values of the resistors (34c and 34d) are set so that a current adapted to close the contact portion (2a) of the vehicle configuration circuit (2) does not flow through the coil portion (2b) of the vehicle configuration circuit (2) when the first switching element (33) is OFF.

According to an embodiment of the present invention, a relay fault determination port connected to a power source is used as a control port of a vehicle configuration circuit. This keeps to a minimum the increase in the number of dedicated relay fault determination ports. As a result, it is possible to enhance the degree of freedom in designing a control section and reduce the wiring for the connections with external devices.

According to an embodiment of the present invention, the behavior of the relay by means of a signal input to a second port is detected. This makes it possible to detect a fault of a power relay.

According to an embodiment of the present invention, it is possible to determine that the relay is functional when the relay behaves as expected.

According to an embodiment of the present invention, it is possible to detect, by means of a signal input to the second port, that the relay is in a non-functional condition.

According to an embodiment of the present invention, it is possible to detect a possible sticking of a contact portion of the relay.

According to an embodiment of the present invention, it is possible to proactively avoid defects resulting from the faulty relay by determining at an early stage after power-on whether the relay is faulty.

According to an embodiment of the present invention, it is possible to ensure that power is not supplied to a differential lock to the extent possible when the relay is faulty.

According to an embodiment of the present invention, it is possible not only to report the occurrence of a non-functional condition to the driver but also to disable the activation of the differential lock.

According to an embodiment of the present invention, a port is allowed to serve two purposes using a coil.

According to an embodiment of the present invention, it is possible to switch between functions of the second port by turning a first switching element ON or OFF.

According to an embodiment of the present invention, a vehicle configuration circuit is prevented from turning ON by itself.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
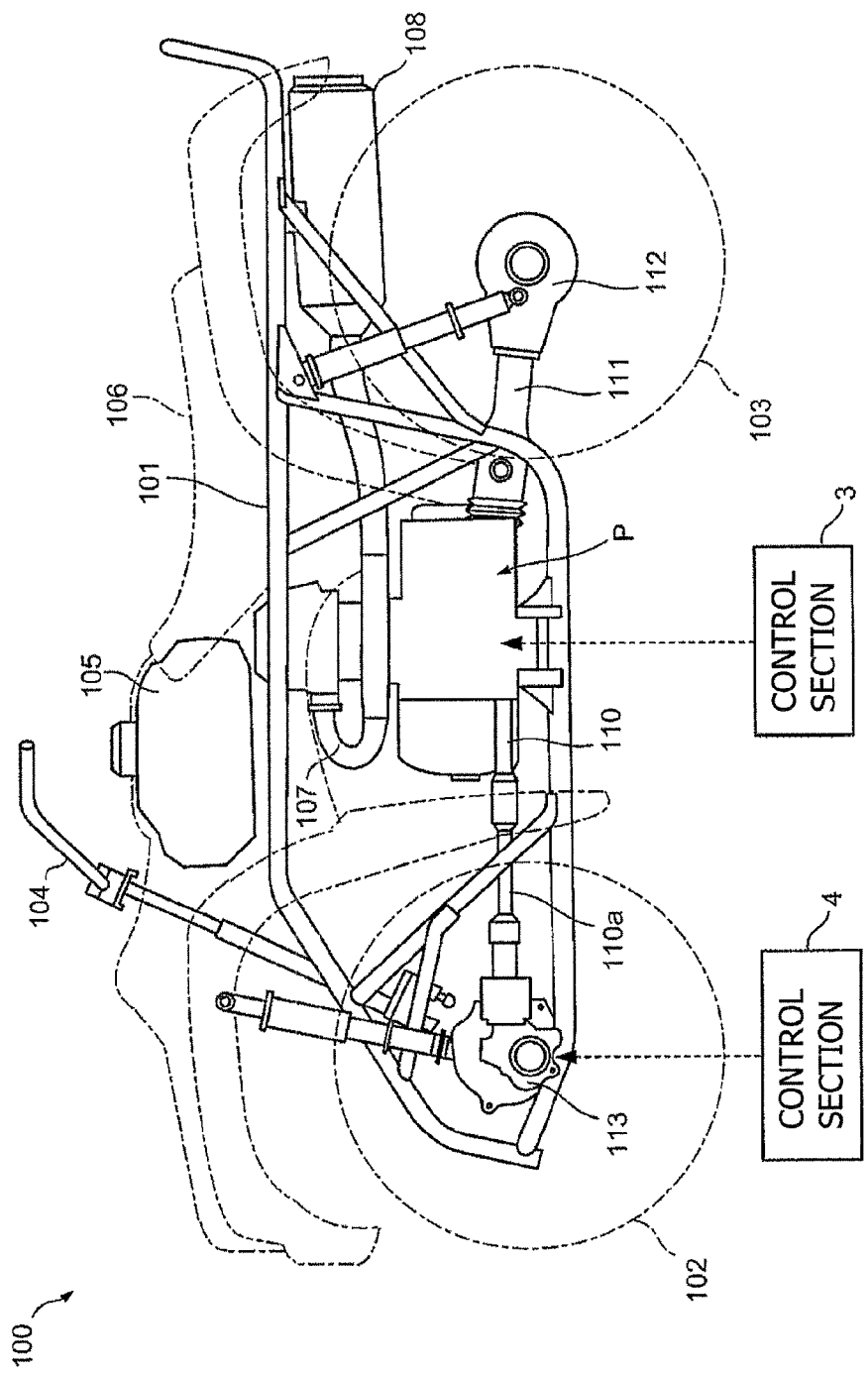
FIG. 1 is a schematic side view of a vehicle, an application example of the present invention.
Figure 2:
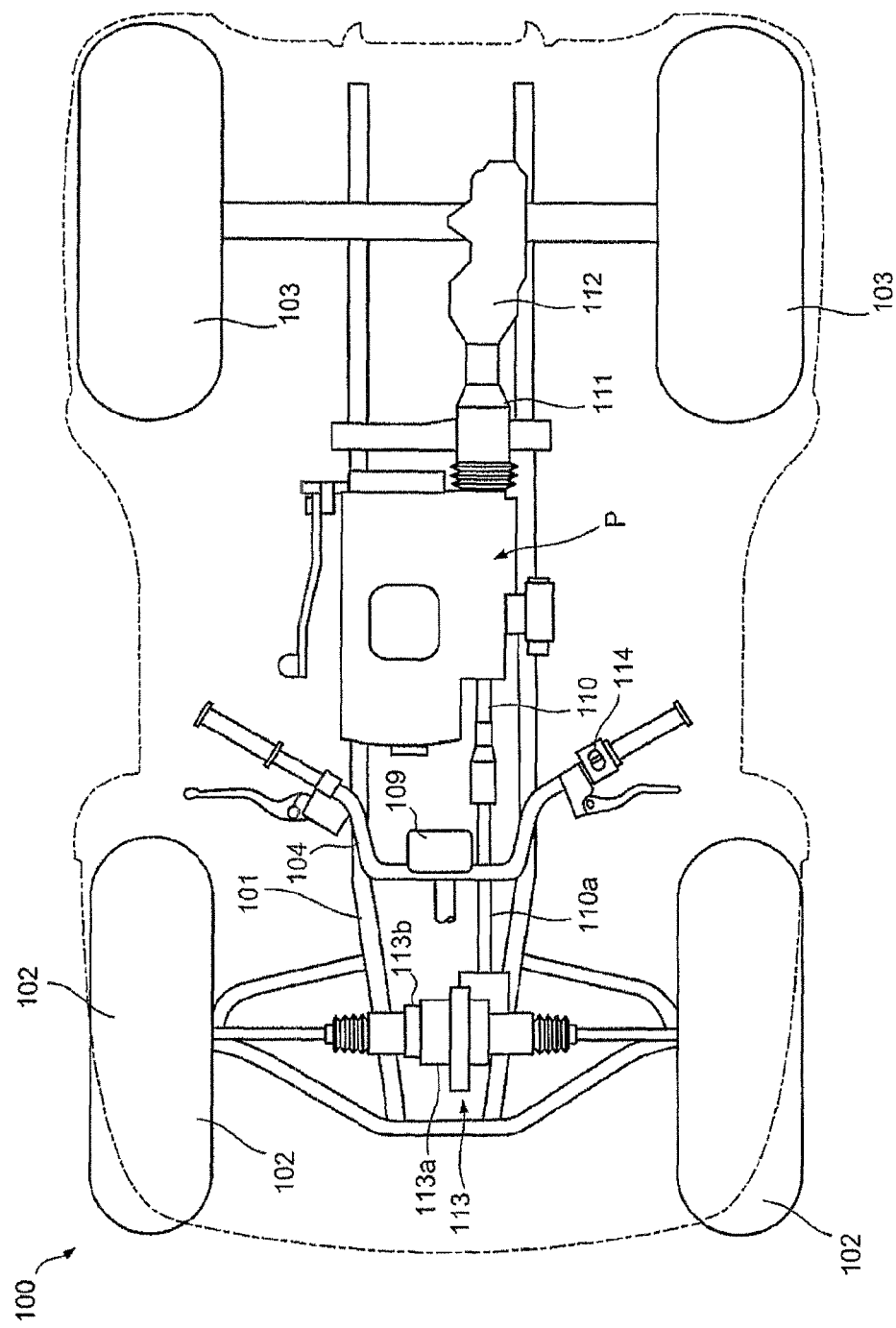
FIG. 2 is a schematic plan view of the vehicle, an application example of the present invention.

FIGS. 1 and 2 are schematic side and plan views of a vehicle 100 illustrating an application of an example of the present invention. The vehicle 100 is a rough terrain vehicle, and more particularly, a saddle type four-wheeled buggy. However, the present invention is not limited to four-wheeled buggies. Instead, the present invention is applicable to various types of vehicles.

The vehicle 100 has a vehicle frame 101 made up of pipes and other members welded together. A pair of left and right front wheels 102, steering and driving wheels, is suspended from the front portion of the vehicle frame 101. A pair of left and right rear wheels 103, driving wheels, is suspended from the rear portion of the vehicle frame 101.

A handle 104 is provided at the front edge of the vehicle frame 101 to steer the front wheels 102. An instrument section 109 is arranged at the center portion of the handle 104 so that various pieces of information can be reported to the driver. Further, an operation button 114 that can be operated by the driver is arranged on part of the handle 104. In the case of the present embodiment, the operation button 114 is used by the driver to select a driving method.

A fuel tank 105 is arranged at the longitudinally intermediate portion of the vehicle frame 101. A straddle type seat 106 is arranged more to the rear than the fuel tank 105 and at the upper portion of the vehicle frame 101. A power unit P is mounted below the seat 106. The power unit P rotates and drives a drive shaft 110. The power unit P includes, for example, an engine, a transmission, a clutch, and a generator. The engine is driven by fuel supplied from the fuel tank 105. The transmission reduces the engine output. The clutch permits or interrupts power transfer between the engine and the transmission. The generator is driven by the engine. Exhaust gas from the engine of the power unit P is released from a muffler 9 into the atmosphere via an exhaust pipe 107.

The driving force of the drive shaft 110 is transferred to a final reduction gear 112 via a propeller shaft accommodated in a swing arm 111, thus driving the rear wheels 103. A differential can be provided in the final reduction gear 112.

The driving force of the drive shaft 110 is also transferred to a final reduction gear 113 via a propeller shaft 110a, thus driving the front wheels 102. Connecting the drive shaft 110 and the propeller shaft 110a with a constant velocity joint provides four-wheel drive at all times. Connecting the drive shaft 110 and the propeller shaft 110a with a clutch permits selection between two- and four-wheel drives.

The final reduction gear 113 includes a differential 113a of the front wheels 102 and a differential lock 113b of the differential 113a. Activating the differential lock 113b locks the differential 113a, thus restricting the difference in rotation between the left and right front wheels 102. The driver can select whether to activate the differential lock 113b by operating the operation button 114.

The vehicle 100 includes control sections 3 and 4. The control section 3 is an electric circuit adapted to take charge of controlling the engine of the power unit P and the vehicle 100 as a whole. The control section 4 is an electric circuit adapted to take charge of controlling the differential lock 113b.

Figure 3:
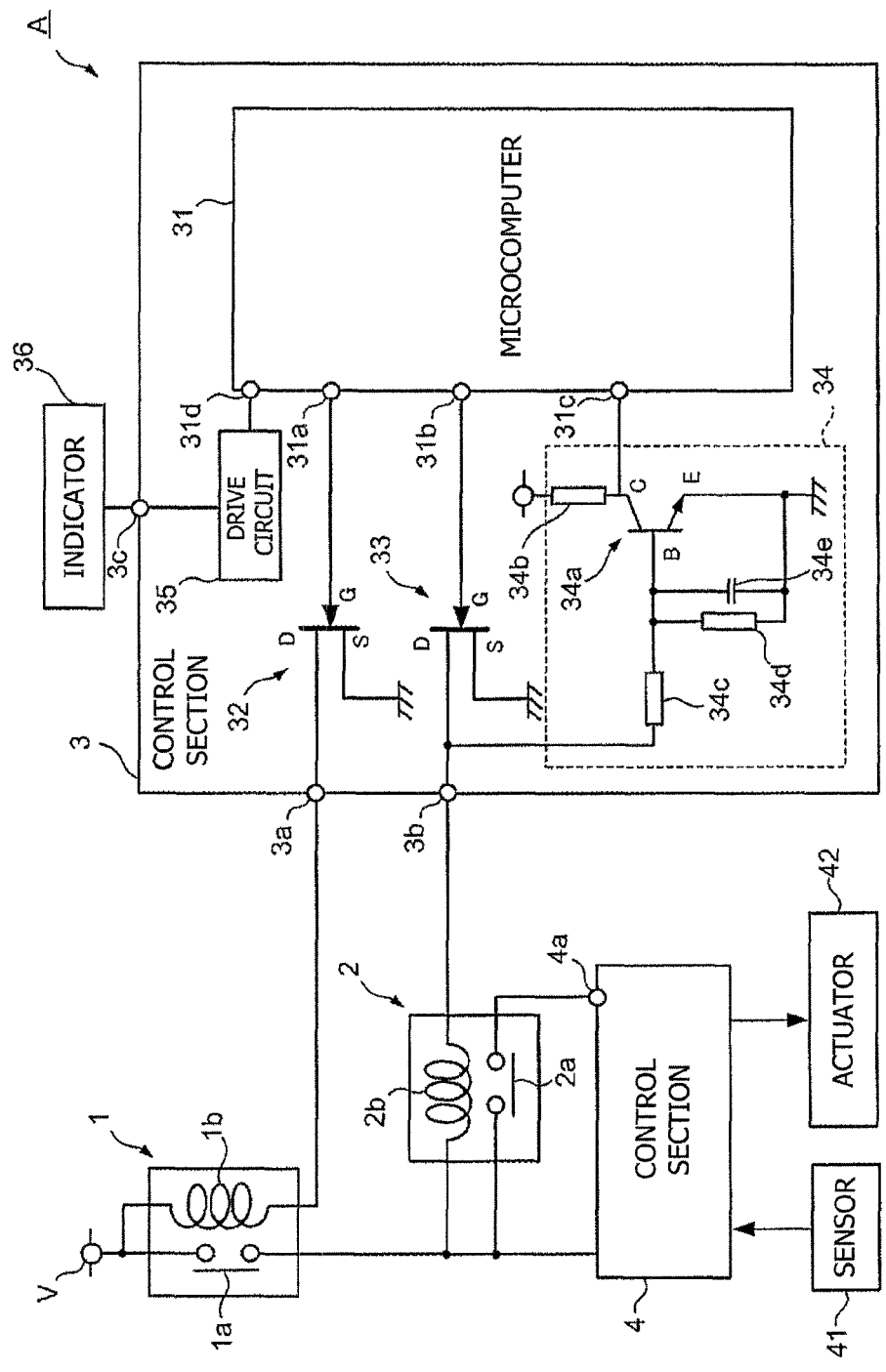
FIG. 3 is a block diagram of a vehicle fault determination device.

FIG. 3 is a block diagram of a vehicle fault determination device A, an embodiment of the present invention. In the case of the present embodiment, the fault determination device A primarily includes the control section 3. FIG. 3 illustrates only the control sections 3 and 4 related to fault determination and their peripheral circuit components.

The fault determination device A includes a power relay 1 and a vehicle configuration circuit 2. The power relay 1 is connected to a power source V such as power circuit that is in turn connected to a battery that is not shown. The vehicle configuration circuit 2 is supplied with power from the power source V via the relay 1. The power relay 1 is an electric circuit subject to fault determination. The control section 3 not only controls the activation of the power relay 1 and the vehicle configuration circuit 2 but also determines whether the power relay 1 is faulty.

The power relay 1 is a relay adapted to allow or interrupt the supply of power to the control section 4. The power relay 1 includes a contact portion 1a and a coil portion 1b adapted to open or close the contact portion 1a. The control section 4 drives an electric actuator 42 (e.g., motor). The electric actuator 42 activates the differential lock 113b based on the detection results of various types of sensors 41. The various types of sensors 41 include a switch for the operation button 114. In the event of a non-functional condition of some kind, the control section 3 interrupts the power relay 1, thus interrupting the supply of power to the control section 4 and disabling the activation of the actuator 42. This prevents the differential 113a from becoming locked as a result of the activation of the differential lock 113b. More specifically, the power relay 1 makes up a fail-safe relay adapted to allow or interrupt the supply of power from the power source V to the control section 4.

In the present embodiment, the vehicle configuration circuit 2 is a relay adapted to output an enable signal to the control section 4 (hereinafter referred to as the enable/disable relay). The enable signal enables the activation of the differential lock 113b. The vehicle configuration circuit 2 includes a contact portion 2a and a coil portion 2b adapted to open or close the contact portion 2a. Although, in the case of the present embodiment, the vehicle configuration circuit 2 is a relay, other electric circuits may also be used.

The control section 4 can enable differential locking during a period of time in which it receives an enable signal from the enable/disable relay 2. The control section 4 does not enable differential locking when it is not receiving an enable signal. The control section 3 determines whether to enable differential locking based on the driving and vehicle conditions, thus turning the enable/disable relay 2 ON or OFF and switching between the presence and absence of an enable signal.

One side of the contact portion 1a of the power relay 1 and one end of the coil portion 1b thereof are connected to the power source V. The other side of the contact portion 1a is connected to the control section 4, one side of the contact portion 2a of the enable/disable relay 2, and one end of the coil portion 2b thereof.

The other end of the coil portion 1b of the power relay 1 is connected to an operation port 3a (also referred to as an output port 3a) of the control section 3. Depending on the output state of the output port 3a, the power relay 1 can be switched between two states. In one of the two states (conducting state), the contact portion 1a is closed as a result of the flow of a current through the coil portion 1b. In another of the two states (non-conducting state), the contact portion 1a is open because a current necessary to close the contact portion 1a does not flow through the coil portion 1b.

The other end of the coil portion 2b of the enable/disable relay 2 is connected to an operation port 3b (also referred to as an input/output port 3b) of the control section 3. The input/output port 3b serves two purposes, one as an input port and another as an output port. The input/output port 3b serves as an input port during fault determination and as an operation (output) port when the enable/disable relay 2 is controlled. The coil making up the coil portion 2b does not generate a force to close the contact portion 2a depending on the magnitude of current flowing through the coil. Therefore, using a coil allows the port to serve two purposes.

Depending on the output state of the input/output port 3b, the enable/disable relay 2 can be switched between two states. In one of the two states (conducting state), the contact portion 2a is closed as a result of the flow of a current through the coil portion 2b. In another of the two states (non-conducting state), the contact portion 2a is open because a current necessary to close the contact portion 2a does not flow through the coil portion 2b.

The other side of the contact portion 2a of the enable/disable relay 2 is connected to an input port 4a of the control section 4. When the contact portion 2a of the enable/disable relay 2 is closed with the contact portion 1a of the power relay 1 closed, this serves as an enable signal, thus bringing the input port 4a to the level of the power source voltage.

The control section 3 is, for example, a single chip ASIC that includes a microcomputer 31. The control section 3 includes not only the above-mentioned output port 3a and input/output port 3b but also an output port 3c as input and output ports for communication with external devices. An indicator 36 is connected to the output port 3c. The indicator 36 is a light-emitting element such as LED adapted to report a fault of the power relay 1. The indicator 36 is arranged, for example, in the instrument section 109 (FIG. 2). The control section 3 includes a drive circuit 35 adapted to drive the indicator 36. The drive circuit 35 activates the indicator 36 in response to a control signal output from an output port 31d of the microcomputer 31.

The microcomputer 31 includes a CPU, a storage section such as ROM, and an I/O interface and executes a program stored in the internal storage section or in an external storage section. The microcomputer 31 includes output ports 31a and 31b and an input port 31c in addition to the above-mentioned output port 31d.

A switching element 32 is provided between the output port 3a and the output port 31a. The switching element 32 is an FET in the present embodiment. However, other type of switching element may also be used as the switching element 32. The drain of the switching element 32 is connected to the output port 3a. The source thereof is grounded. The gate thereof is connected to the output port 31a. Therefore, the switching element 32 is turned ON or OFF by a signal output from the output port 31a. When the switching element 32 is turned ON, a current flows through the coil portion 1b of the power relay 1, thus closing the contact portion 1a. When the switching element 32 is turned OFF, the contact portion 1a is opened.

A switching element 33 is provided between the input/output port 3b and the output port 31b. The switching element 33 is an FET in the present embodiment. However, other type of switching element may also be used as the switching element 33. The drain of the switching element 33 is connected to the input/output port 3b. The source thereof is grounded. The gate thereof is connected to the output port 31b. Therefore, the switching element 33 is turned ON or OFF by a signal output from the output port 31b. When the switching element 33 is turned ON with the contact portion 1a of the power relay 1 closed, a current flows through the coil portion 2b of the enable/disable relay 2, thus closing the contact portion 2a. When the switching element 33 is turned OFF, the contact portion 2a is opened. When the switching element 33 is turned OFF, the drain thereof goes into high impedance state, thus allowing the input/output port 3b to be used as an input port. That is, the switching element 33 serves the function of switching the input/output port 3b between input and output ports. As a result, on the one hand, the input/output port 3b serves as an input port when it is determined whether the power relay 1 is faulty. On the other hand, the input/output port 3b serves as an output port when the enable/disable relay 2 is controlled.

An input circuit 34 is provided between the input/output port 3b and the output port 31c. The input circuit 34 includes a switching element 34a, resistors 34b to 34d, and a capacitor 34e. The switching element 34a is a bipolar transistor in the present embodiment. However, another type of switching element may also be used as the switching element 34a. The collector of the switching element 34a is connected to the input port 31c and pulled up via the resistor 34b. The emitter thereof is grounded. The base thereof is connected to the input/output port 3b via the resistor 34c. The resistor 34d and the capacitor 34e are connected in parallel between the base and the emitter of the switching element 34a. Therefore, the switching element 34a is turned ON or OFF by a signal input to the input/output port 3b.

When it is determined whether the power relay 1 is faulty, a test signal is output to the output port 3a. More specifically, the switching element 32 is turned OFF, thus bringing the output port 3a to the GND level and opening the contact portion 1a of the power relay 1 for control purpose. Further, the switching element 33 is turned OFF, thus allowing the input/output port 3b to be used as an input port. Then, it is determined based on the signal input to the input/output port 3b whether the power relay 1 is faulty.

If the contact portion 1a of the power relay 1 is stuck or in other non-functional condition, a current flows through the contact portion 1a, the coil 2b, the input/output port 3b, and the resistors 34c and 34d, thus turning ON the switching element 34a. As a result, the input port 31c changes from high to low level, thus making it possible to determine that the power relay 1 is faulty. When the contact portion 1a of the power relay 1 is in a functional condition, the input/output port 3b is open, thus leaving the switching element 34a OFF. This makes it possible to detect a fault of the power relay 1 by detecting the behavior of the power relay 1 based on the signal input to the input/output port 3b.

When the power relay 1 is found to be functional after the fault determination, the contact portion 1a of the power relay 1 is closed. This supplies power to the control section 4 and enables the activation of the differential lock 113b. As the contact portion 1a is closed, a current flows through the coil portion 2b of the enable/disable relay 2. The magnitude of this current is proportional to the resistance values of the resistors 34c and 34d. If this current is large, the coil portion 2b closes the contact portion 2a. Therefore, the resistance value of at least one of the resistors 34c and 34d is selected so that a current large enough to close the contact portion 2a does not flow through the coil portion 2b when the switching element 33 is OFF. This prevents the enable/disable relay 2 from turning ON by itself.

As described above, the input/output port 3b serves two purposes, one as a fault detection port for the power relay 1 and another as a control port for the enable/disable relay 2. This keeps to a minimum the increase in number of dedicated ports for determining whether the power relay is faulty. As a result, it is possible to enhance the degree of freedom in designing the control section 3 and reduce the wiring required for connection between the control section 3 and external devices.

Figure 4B:
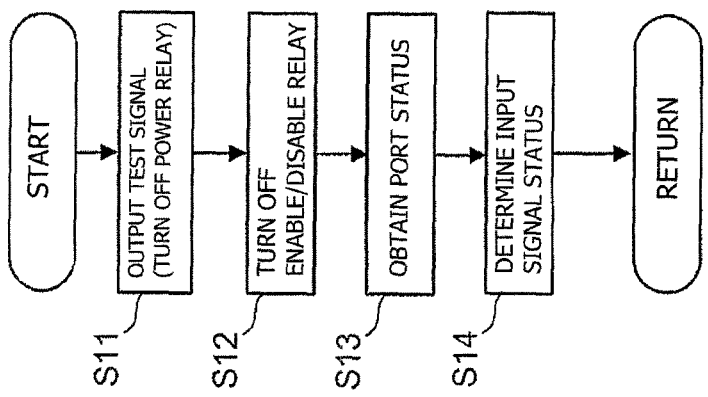
FIGS. 4(A) and 4(B) are flowcharts of processes for fault determination.
Figure 4A:
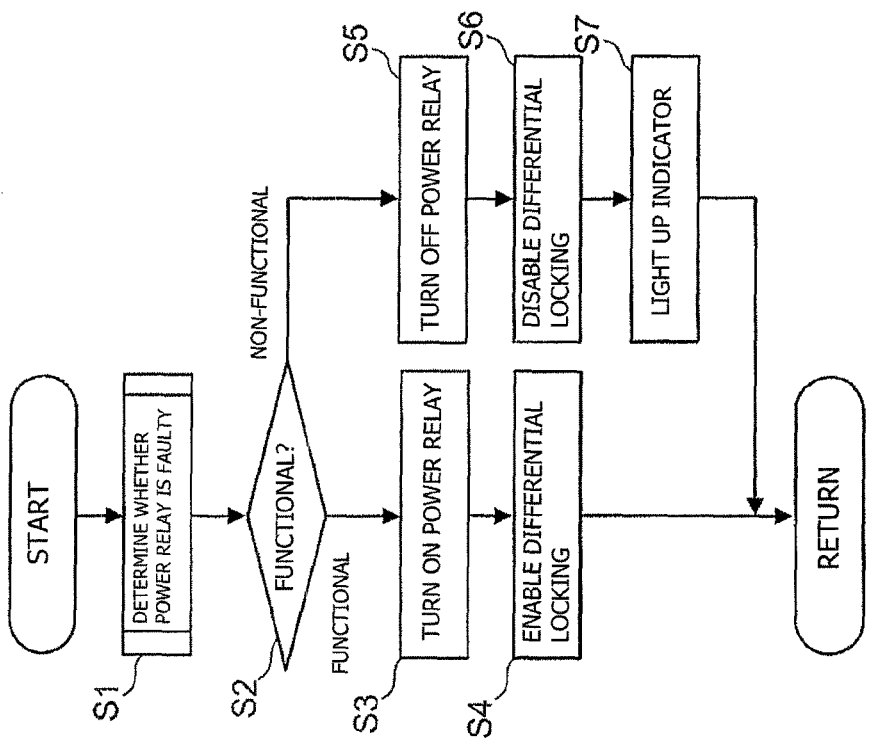

A description will be given next of examples of processes performed by the CPU of the microcomputer 31 with reference to FIGS. 4(A) and 4(B). These figures show flowcharts for the processes related to fault determination of the power relay 1. The process shown in FIG. 4(A) can be performed as part of an initial process after the vehicle 100 is powered on (e.g., after the ignition is turned ON) and before the vehicle 100 is made ready to drive. In particular, this process can be performed before the enable/disable relay 2 is activated. It is possible to proactively avoid defects resulting from the faulty power relay 1 by determining at an early stage after the power is on whether the power relay 1 is faulty.

In step S1, it is determined whether the power relay 1 is faulty. The details thereof will be described later. In step S2, it is determined whether the relay is in a functional condition as a result of the fault determination in step S1. The process proceeds to step S3 when the power relay 1 is in a functional condition. The process proceeds to step S5 if the power relay 1 is in a non-functional condition.

In step S3, the power relay 1 is turned ON. More specifically, the switching element 32 is turned ON, thus causing a current to flow through the coil portion 1b of the power relay 1 and closing the contact portion 1a. In step S4, the enable/disable relay 2 is activated, thus outputting an enable signal to the control section 4 and enabling differential locking. More specifically, the switching element 33 is turned ON, thus causing a current to flow through the coil portion 2b of the enable/disable relay 2 and closing the contact portion 2a.

In step S5, the power relay 1 is turned OFF. More specifically, the switching element 32 is turned OFF, thus opening the contact portion 1a for control purpose. The power relay 1 is in a non-functional condition. Practically, therefore, there are cases in which the contact portion 1a does not open. However, it is possible to ensure that power is not supplied to the differential lock 113b to the extent possible when the power relay 1 is faulty.

In step S6, the enable/disable relay 2 is not activated, thus preventing an enable signal from being output to the control section 4. This disables differential locking. More specifically, the switching element 33 is turned OFF, thus opening the contact portion 2a. In step S7, the indicator 36 is activated, thus reporting the occurrence of a fault to the driver. This completes one unit of the process.

A description will be given next of the fault determination process in step S1 with reference to FIG. 4(B). In step S11, a test signal is output to the output port 3a. More specifically, the switching element 32 is turned OFF, thus opening the contact portion 1a for a control purpose. In step S12, the enable/disable relay 2 is turned OFF. More specifically, the switching element 33 is turned OFF, thus allowing the input/output port 3b to be used as an input port. As a result, a signal is input to the input/output port 3b and further to the input port 31c in response to the test signal. This signal indicates the behavior of the power relay 1.

In step S13, the state of the input port 31c is obtained. In step S14, the state of the input signal supplied to the input/output port 3b is determined. When the state of the input signal supplied to the input/output port 3b indicates that the contact portion 1a is open, the power relay 1 is determined to be in a functional condition. More specifically, when the input port 31c is at high level, the power relay 1 is determined to be in a functional condition. On the other hand, if the state of the input signal supplied to the input/output port 3b indicates that the contact portion 1a is closed, the power relay 1 is determined to be in a non-functional condition. More specifically, when the input port 31c is at a low level, the power relay 1 is determined to be in a non-functional condition. This completes one unit of the process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle fault determination device comprising:
a relay connected to a power source;
a vehicle configuration circuit supplied with power from the power source via the relay; and
a control section adapted to determine whether the relay is faulty while controlling the relay and the vehicle configuration circuit;
wherein the control section includes:
a first port adapted to output a control signal to a coil portion of the relay; and
a second port connected to a contact portion of the relay via the vehicle configuration circuit; and
the second port serves as an input port when the fault determination is made and as an operation port when the vehicle configuration circuit is controlled;
wherein the control section outputs a given test signal to the first port during the fault determination; and
the control section determines whether the relay is faulty based on the signal input to the second port.

2. The vehicle fault determination device according to claim 1, wherein the test signal is a signal adapted to open the contact portion of the relay; and
the control section determines that the relay is in a functional condition when the signal input to the second port indicates that the contact portion is open.

3. The vehicle fault determination device according to claim 1, wherein the control section performs the fault determination after power-on and prior to the activation of the vehicle configuration circuit.

4. The vehicle fault determination device according to claim 1, wherein the test signal is a signal adapted to open the contact portion of the relay; and
the control section determines that the relay is in a non-functional condition when the signal input to the second port indicates that the contact portion is closed.

5. The vehicle fault determination device according to claim 4, wherein the non-functional condition is a sticking of the contact portion.

6. The vehicle fault determination device according to claim 1, wherein a vehicle includes a differential lock being adapted to lock a differential operatively connected to wheels of the vehicle;
the relay is a fail-safe relay adapted to supply or interrupt power from the power source to an electric circuit of the differential lock; and
the control section outputs a signal adapted to open the contact portion to the first port if the control section determines that the fail-safe relay is faulty.

7. The vehicle fault determination device according to claim 6, further comprising:
an indicator adapted to report a fault of the fail-safe relay;
wherein the vehicle configuration circuit is the enable/disable relay adapted to output an enable signal to the electric circuit of the differential lock so as to enable differential locking; and
when the control section determines that the fail-safe relay is faulty, the control section activates the indicator and controls the enable/disable relay in such a manner as not to output the enable signal.

8. The vehicle fault determination device according to claim 1, wherein the vehicle configuration circuit is the relay; and
a coil portion of the vehicle configuration circuit is connected to the second port.

9. The vehicle fault determination device according to claim 8, wherein the control section includes;
a microcomputer adapted to execute a program for the fault determination;
a first switching element provided between an output port of the microcomputer and the second port; and
a second switching element provided between an input port of the microcomputer and the second port;
the first switching element is turned ON or OFF by a signal output from the output port;
the second switching element is turned ON or OFF by a signal input to the second port; and
when the first switching element is turned ON, a current flows through the coil portion of the vehicle configuration circuit to close a contact portion of the vehicle configuration circuit.

10. The vehicle fault determination device according to claim 9, wherein the control section includes resistors connected to the second port; and
the resistance values of the resistors are set so that a current adapted to close the contact portion of the vehicle configuration circuit does not flow through the coil portion of the vehicle configuration circuit when the first switching element is OFF.

11. A vehicle fault determination device comprising:
a relay adapted to be connected to a power source;
a vehicle configuration circuit adapted to be supplied with power from the power source via the relay; and
a control section for determining if whether the relay is faulty while controlling the relay and the vehicle configuration circuit;
wherein the control section includes:
a first port for outputting a control signal to a coil portion of the relay; and
a second port connected to a contact portion of the relay via the vehicle configuration circuit; and
said second port serving as an input port when the fault is determined and as an operation port when the vehicle configuration circuit is controlled;
wherein the control section outputs a given test signal to the first port during the fault determination; and
the control section determines whether the relay is faulty based on the signal input to the second port.

12. The vehicle fault determination device according to claim 11, wherein the test signal is a signal adapted to open the contact portion of the relay; and
the control section determines that the relay is in a functional condition when the signal input to the second port indicates that the contact portion is open.

13. The vehicle fault determination device according to claim 11, wherein the test signal is a signal adapted to open the contact portion of the relay; and
the control section determines that the relay is in a non-functional condition when the signal input to the second port indicates that the contact portion is closed.

* * * * *